Dec. 7, 1948.  D. E. SUNSTEIN  2,455,532
LIGHT RESPONSIVE DISPLACEMENT INDICATOR
Filed May 24, 1945  4 Sheets-Sheet 1

INVENTOR
David E. Sunstein
BY
Ostrolenk and Faber
ATTORNEY

Dec. 7, 1948.   D. E. SUNSTEIN   2,455,532
LIGHT RESPONSIVE DISPLACEMENT INDICATOR
Filed May 24, 1945   4 Sheets-Sheet 2

INVENTOR
David E. Sunstein
BY
Ostrolenk and Faber
ATTORNEY

Dec. 7, 1948.  D. E. SUNSTEIN  2,455,532
LIGHT RESPONSIVE DISPLACEMENT INDICATOR

Filed May 24, 1945  4 Sheets-Sheet 3

INVENTOR
David E. Sunstein
BY
Ostrolenk and Faber
ATTORNEYS

Patented Dec. 7, 1948

2,455,532

UNITED STATES PATENT OFFICE 2,455,532

LIGHT RESPONSIVE DISPLACEMENT INDICATOR

David E. Sunstein, Elkins Park, Pa., assignor to Philco Corporation, a corporation of Pennsylvania Application May 24, 1945, Serial No. 595,579

8 Claims. (Cl. 177—351)

My invention relates to a novel system for obtaining an electrical signal which is proportional to a mechanical displacement in such a manner that no mechanical load is placed upon the moving object. More particularly, my invention constitutes a means for obtaining such a voltage entirely by electronic means comprising a cathode ray tube and a photoelectric cell arranged in combination with a feed-back amplifier.

Previously employed methods of translating a mechanical motion or position into an electrical signal have had in addition to frequency response limitations, several disadvantages. For example, in some cases the measuring mechanism imposed a mechanical load upon the moving member while in other cases the allowable motion for proportionality of response was quite small.

An example of the former is an electrical rheostat in association with the moving part. This rheostat has mechanical friction associated with it, and has mechanical mass associated with it. Thus it loads the mechanical system with both the friction and mass of the rheostat as well as the limitations of the apparatus controlled by the rheostat.

An example of a system which imposes practically no mechanical load is the variation of capacitance of a condenser as the translating mechanism. Such a device is normally limited to quite small variations in displacement, and is furthermore rather sensitive to extraneous electrical disturbances.

In accordance with my invention, it is possible to obtain an electrical signal which is proportional to the mechanical motion of an object for either a small variation or displacement of the object, or a relatively large displacement or variation in position of the object relatively independently of the speed of such variation, and without imposing any mechanical load whatsoever upon the moving parts, and without mechanical inertia in the signal generating system.

In one embodiment of my invention, a spot of light on the luminous surface of a cathode ray tube is caused to follow the motion of an edge or margin of the mass or object whose motion it is desired to convert into corresponding electrical signals. The moving object is optically interposed between a cathode ray tube and a photoelectric cell. The correspondence between the light spot and the moving object is observed by the photoelectric cell.

In that embodiment normally the object obstructs a considerable portion of the light spot so that the light impinging on the photoelectric cell is substantially less than what it otherwise would have been if the light were not obstructed. Under this condition the signal output of the photoelectric cell functions to maintain the light spot on the cathode ray tube in its position. If now the object moves relative to the light spot so that the spot is above the object and so that the light impinging on the photoelectric cell is increased, the rise in signal response of the photoelectric cell will actuate an amplifier which will tend to make the spot on the cathode ray tube follow the object to its new position.

As the cathode ray tube spot begins to be obstructed when it reaches the object in its new position, the signal response of the photoelectric cell decreases and the output of the amplifier correspondingly drops until the voltage across the deflecting plates of the cathode ray tube is such as to maintain the light spot in its new deflected position. This new position of equilibrium is reached when the cathode ray tube light spot is obstructed by the object to a lesser extent than was obtained in the first normal condition described above. The extent to which the object obstructs the light spot is a function of the extent of movement of the object from its normal position. In this condition the photoelectric cell output is such as to maintain the spot fixed with relation to the object.

Thus the spot on the cathode ray tube will move downward towards the object being followed, and will continue to do so until it reaches the object and is obstructed as far as the photoelectric cell is concerned by the object being followed by an amount determined by the extent of movement of the object. When this condition is obtained, the output of the photoelectric cell drops off. This reduced output causes the spot to stop moving and consequently the spot stays in this position on the edge of the moving object.

If the mechanically moving element should rise and thus obscure the spot, the decreased output of the photoelectric cell will actuate the amplifier in such a way that the spot on the cathode ray tube will tend to rise. As soon as the spot begins to emerge from behind the moving element, the increased illumination on the photoelectric cell causes the output of the amplifier to change in such a way that the motion of the spot becomes slower. The spot will then come to rest when the spot is exposed to the photoelectric cell to an extent sufficient to maintain it in its new deflected position.

The action then is this, that if the moving element moves down, the spot will follow it down, and if the moving object moves up, the spot will follow it up. As a result, the spot will always follow the edge of the moving element, no matter whether it moves up or down.

The speed of response of the electrical system from the photoelectric cell through the amplifier to the spot on the cathode ray tube is practically instantaneous compared to speeds encountered in mechanical motions. Consequently there is no time lag of an appreciable nature.

The electrical output of the system can most conveniently be obtained as the voltage on the deflecting plates of the cathode ray tube. This is the voltage which deflects the cathode ray beam to the proper position in correspondence with the reference point of the mechanical system whose motion is being followed.

Normally the screen of the cathode ray tube is of the order of a few inches in diameter. Thus it is possible to follow objects which have motions of the order of a few inches. However, if the motion of the object is to be very much less than a few inches, lenses may be employed in order to reduce the apparent size of the cathode ray screen to approximately the size of the motion to be encountered. Thus it is possible to follow rather small motions even though the actual motion of the spot on the cathode ray tube may still be from the top to the bottom of the cathode ray tube face; that is, over a distance of two or three inches. Likewise, if the motion to be followed is greater than the size of the cathode ray tube, it is again possible through the use of lenses to enlarge the apparent motion of the spot so that the actual spot on the cathode ray tube face will not be required to go beyond the edge of the screen of the tube. Furthermore, mirrors or prisms may be used as desired to change the direction of the light rays in any desired manner.

By the use of appropriate colored filters or by the use of polarizing elements, it is possible to make the spot on the cathode ray tube follow an object which is moving in a plane, instead of along a line only. To do this, the polarizing screen or the filter elements may be attached to the object so that it moves along with the mechanical system whose motion is to be translated to electrical signals. Such a system, in addition to the polarizing screen or color filters, in one embodiment employs two photoelectric cells, each with its associated amplifier, one leading into the horizontal deflection plates of the cathode ray tube and the other leading to the vertical deflection plates. Two electrical outputs will then be obtained; one being the vertical deflection or motion, and the other being the horizontal deflection or motion.

It is also possible to cause the cathode ray spot to follow one edge of a relatively narrow member being moved up and down or back and forth in front of the cathode ray tube. This is accomplished by causing the spot on the cathode ray tube to follow one edge of the moving wire or narrow member. Special electronic circuits of my invention may be employed to bring the spot back to the proper position if it should get out of the controlling range.

Accordingly, an object of my invention is to provide a novel system for translating mechanical motion into electrical signal without applying any mechanical load to the mechanical system.

Another object of my invention is to provide a means of detecting extremely rapid or extremely slow mechanical movements.

A further object of my invention is to provide a novel completely electronic system for measuring the movement or positions of an object.

Still another object of my invention is to provide a novel cathode ray tube system for measuring mechanical or vibratory movements.

Still a further object of my invention is to provide a degenerative circuit including a photo cell and cathode ray tube.

There are other objects of my invention which together with the foregoing will appear in the detailed description to follow in connection with the drawings in which Figure 1 represents a simplified diagram of the system as used to follow the up and down motion of an object.

Figure 1:
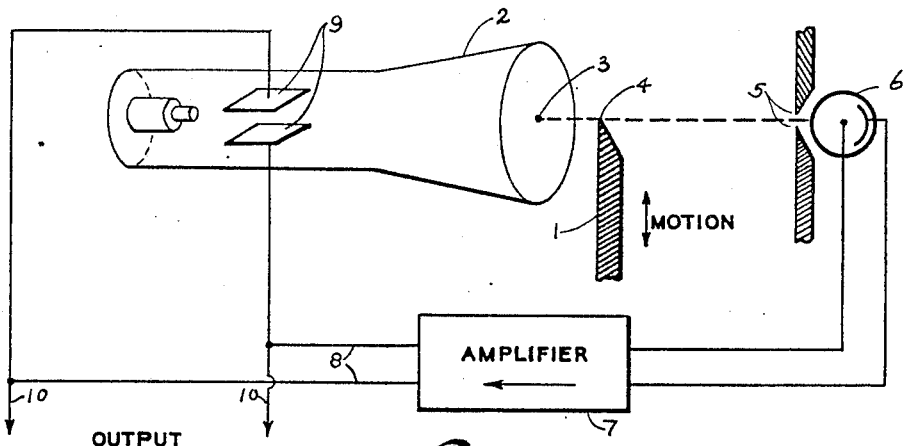

In Figure 1 the mechanical device whose motion is to be measured is shown as an optically opaque mask 1 having in the embodiment here shown a triangular corner on its upper end.

On one side of the mask 1 is a cathode ray tube 2 having the usual cathode ray, the deflection of which is under control of the voltage applied to deflecting plates and producing a spot of light on a fluorescent screen at a point thereof determined by the deflection of the cathode ray.

On the other side of the mask 1 may be an iris 5 and photoelectric cell 6. The photoelectric cell 6 is connected to a D. C. amplifier 7, the output of which supplies voltage along conductors 8 to the deflecting plates of the cathode ray tube 2.

The plates are initially supplied with a D. C. bias voltage so that the cathode ray spot appears at the top of the cathode ray tube screen when no light shines on the photo cell 6. The amplifier 7 is connected to the photo cell 6 and to the cathode ray tube deflecting plates with a polarity such that the spot is caused to be deflected downward as the incident light upon the photo cell is increased, as will be explained more fully hereinafter. Thus the cathode spot will be degenerated downward until the edge of the mask 1 prevents almost all light from passing through the iris to the photo cell.

In accordance with one arrangement shown, the photoelectric cell may in this condition receive considerably less than half of the light from the spot 3, the remaining portion of light being cut off by the edge 4 of the mask, and a condition of equilibrium obtains.

If now the mask moves upwards, the light impinging on the photoelectric cell is decreased. Thus, less signal is fed into the amplifier 7. This amplifier is of such a nature that when less signal is fed into it, the output voltage impressed across deflecting plates 9 is changed in such a manner that the spot 3 is caused to rise.

The spot continues to rise until it reaches the edge of the object and some of the light from the spot impinges on the photoelectric cell 6. The resulting change in the photoelectric cell response will bring the spot to a stop at a new upwardly deflected position of equilibrium produced by a voltage output of amplifier 7 which is a function of the extent of movement of the mask or object 1.

If the mask moves downward, then an increased light intensity is thrown on the photoelectric cell. The photoelectric cell output increases correspondingly and the amplifier output voltage is such as to cause the spot on the cathode ray tube to move downward. As in the above example, the new deflected position of equilibrium of the spot is effected by a voltage output of the amplifier 7 which is a function of the extent of downward movement of mask 1. Thus, no matter which way the mask 4 moves, within the limits of the apparatus, the spot on the oscilloscope will follow the motion of the mask.

As will now be obvious, when the mask is in the position shown in Figure 1, the output voltage between conductors 10 will have a specific value. If now the mask 1 is pushed upward, the output has a different value.

This value will be the one corresponding to the new position of the spot 3. In order for the voltage on line 8 to be different than it was before, the input to the amplifier is different than it was before.

Inasmuch as the amplifier preferably has a high gain, it takes only a small amount of change in output from photoelectric cell 6 to cause a considerably change in the position of the spot 3. Accordingly, when the spot is deflected to a different than central position, the spot will in practice take only a slightly different relative position with respect to the mask than it had in the central position. This condition will obtain as long as the amplifier has a sufficiently high gain. Thus, when the mask is lowered, the spot is lowered correspondingly, because the voltage on lines 8 and 10 becomes correspondingly changed. The photoelectric cell output which is fed into the amplifier is also changed in order to change the output of the amplifier. However, the gain of the amplifier is so high that a relatively small input voltage will cause the spot on the cathode ray oscilloscope to drop from the mid-position to the new position of the screen.

This system is essentially an electrical-optical feed-back system. The mechanical motion of the mask 1 is followed by spot 3 on the oscilloscope screen, and the difference in position between the spot 3 and the mask 1 is picked up by photocell 6, fed through the amplifier 7 and back into the oscilloscope through line 8 in order to control the position of spot 3.

From the above description of Figure 1 it will now be understood that the invention may be modified. While the cathode ray tube 2 has been shown without an intensity control grid, such an element may be included and may be used with appropriate circuits to maintain the brightness of the spot 3 constant regardless of the speed of motion of the spot 3.

Moreover, the cathode ray tube may include deflecting plates oriented at right angles to deflecting plates 9 so that the deflection caused thereby would be horizontal when referring to Fig. 1. These deflecting plates may take the usual form.

When a cathode ray tube using two sets of deflecting plates is used, two separate embodiments of the device of Figure 1 are available. The deflecting plates 9 will cause the device to follow the motion in a vertical direction, the other deflecting plates will cause it to follow motion in a horizontal direction.

For simplicity, the amplifier 7 has been considered to be an amplifier which would transmit unidirectional and continuous voltages from its input at photocell 6 to its output at terminals 9. In many cases amplifiers which will only pass limited bands of alternating current will be satisfactory for this purpose. A suitable amplifier of a well known type is shown in multiplier photocell 84 of Figure 8.

Figure 8:
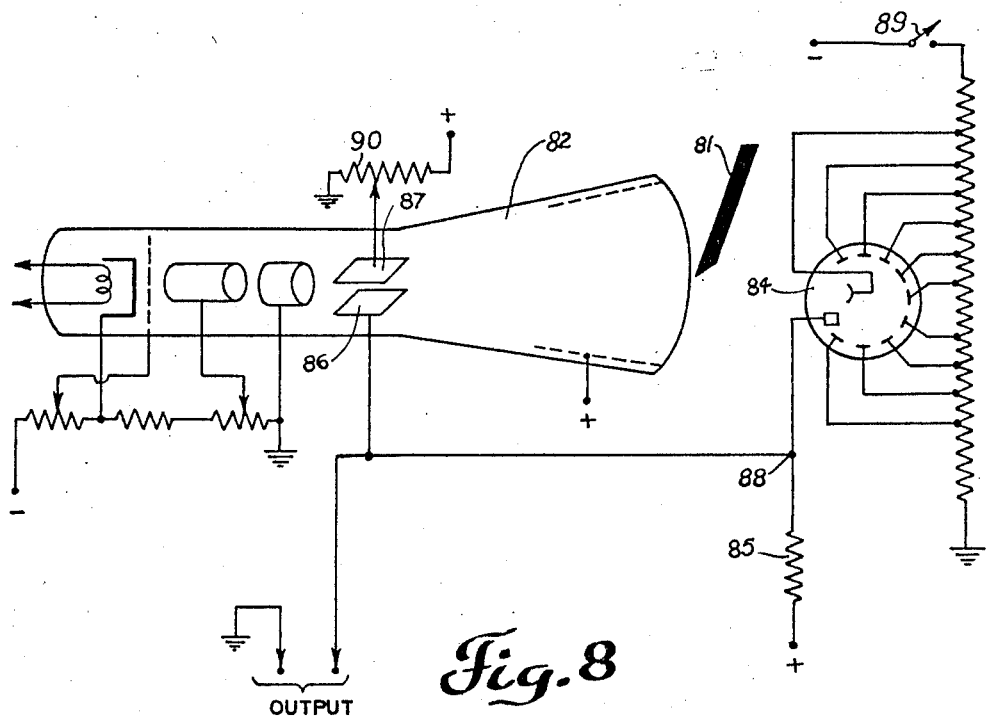
Figure 8 shows an arrangement of the system using a secondary emission multiplier type photoelectric cell.

A detailed electronic circuit for accomplishing the results obtained by Figure 1 is shown in Figure 8. The mask 81, shown inverted with respect to the mask 1 of Figure 1, has the up and down motion which is to be followed. The cathode ray tube 82 has the spot on its screen. The various connections of resistors in the cathode ray tube circuit are in accordance with standard practice of electronic circuit arrangements.

The light from this spot is picked up by photocell 84 which is of the electron multiplier type. This cell, in addition to acting as a photoelectric cell, acts as an amplifier circuit, and gives a large voltage variation across the resistor 85. The variation in this voltage is applied to deflecting plate 86. Deflecting plate 87 is held at a fixed positive potential in any well known manner, such as by means of the semi-adjustable potentiometer 90, which may be set to a suitable operating point by momentarily opening switch 89, thereby causing no current to flow through load resistor 85 and hence simulating the condition of no light impingent upon the photocell 84, and simultaneously adjusting potentiometer 90, so that the spot on the cathode ray tube 82 appears at or near the bottom of the screen thereof.

When the mask moves upwards, an increase of light appears on the photoelectric cell. This causes more current to flow in the photoelectric cell and consequently the potential of point 88 drops. This drop in potential of point 88 causes the deflecting plate 86 to become less positive, and thus the spot in the cathode ray tube is caused to move upward. In this manner the motion of the mask is followed and an output voltage corresponding to the mask movement is secured.

This circuit is, of course, only one embodiment of the general principle shown in Figure 1. Many other circuits could be drawn and constructed which would perform the same function.

Figure 2:
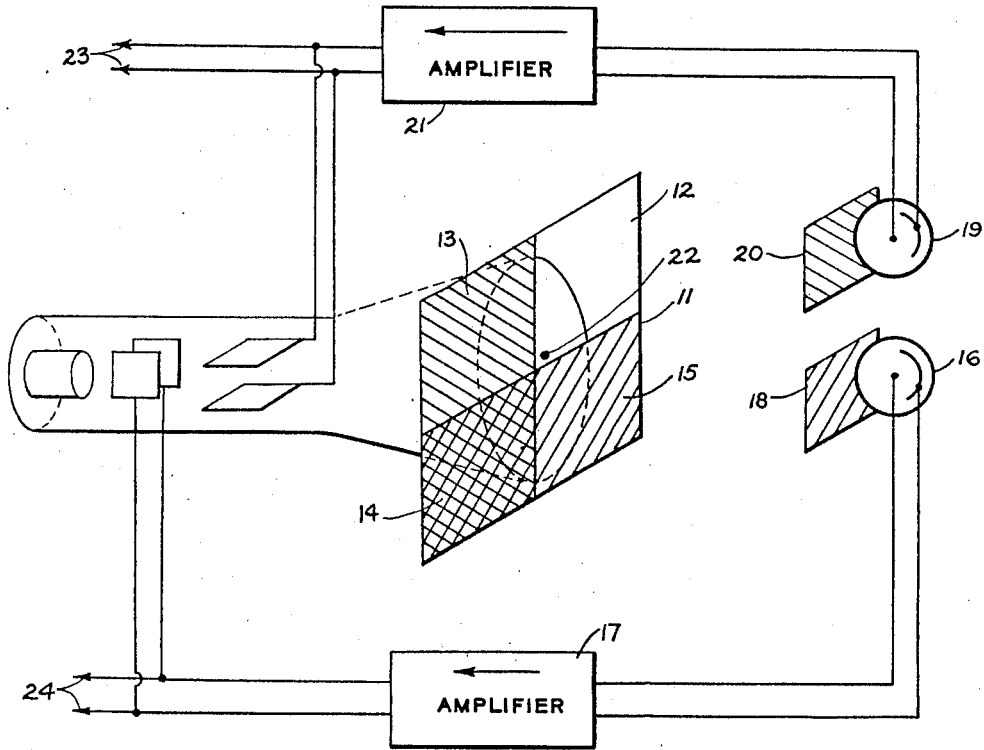
Figure 2 shows a diagram of the system as used to follow motion in a plane.

The system shown in Figure 1 enables the spot of the cathode ray tube to follow the motion of the mask in one dimension only; that is, only up and down, or only right and left. At times it becomes desirable to have the spot follow the motion of the mask in two dimensions the same time; that is, to follow motion in a plane. This may be accomplished with the system shown in Figure 2 which is a modification of the basic principle shown in Figure 1. In Figure 2, in order to follow the motion in two directions, two photocell amplifier combinations are employed. Likewise, in order that these combinations may follow the two motions, the masks are of a certain quality.

In the system described, the spot 22 will endeavor to follow the center point of the mask 11. This mask is made of four different sections. Section 12 is transparent. Section 14 is opaque. Section 13 passes light of one quality and excludes light of another quality. Section 15 does the same thing as section 13, except in reverse. For example, if section 13 will pass horizontally polarized light, but will reject vertically polarized light, then section 15 will pass vertically polarized light and will reject horizontally polarized light; or if section 13 will pass red light and reject blue light, then section 15 will pass blue light and will reject red light.

Each of the photo cells is equipped with a filter. The photo cell 16 which feeds the horizontal amplifier 17 is equipped with a filter 18 which has the same qualities as section 15 in the moving screen.

Accordingly any light that passes through filter 18 will also pass through section 15 and section 12, but light which comes through section 13 will not go through filter 18. Therefore, so far as the photocell 16 is concerned, the spot will be seen if it is to the right of the vertical center line on the moving screen, and the spot will not be seen if it is to the left of the center line of the screen. Consequently, the photo cell 16 in association with the amplifier 17 and the horizontal deflecting system of the cathode ray tube will act in substantially the same manner as Figure 1 acted in the vertical direction, and will keep the spot positioned on the vertical center line of the moving mask.

Likewise, photo cell 19 in conjunction with filter 20, which is opposite in character to filter 18; that is, is like filter 13, will act in association with the vertical amplifier 21 just as the system of Figure 1 acts, and will keep the spot positioned on the horizontal center line. Thus there are two systems operating independently so far as the direction of deflection of the spot 22 is concerned, yet both of them are controlled by the motion of the main screen. Consequently two output signals are obtained, one on conductors 23 and the other on conductors 24. The signal on conductors 23 is proportional to the vertical position of spot 22 and thus proportional to the vertical position of the movable screen. The signal on conductors 24 is proportional to the horizontal position of spot 22 and consequently proportional to the horizontal position of the movable screen.

One of these systems endeavors to keep the spot aligned with the horizontal line of the screen, and the other system endeavors to keep the spot aligned with the vertical line on the screen. Consequently, the two systems together endeavor to maintain the spot aligned with the center of the movable screen. Thus, the motion of the center of the movable screen is followed faithfully by the spot 22, and two voltages corresponding to the two movements of the screen are generated on conductors 23 and 24; one voltage being proportional to the vertical deflection, and another voltage being proportional to the horizontal deflection.

Figure 9:
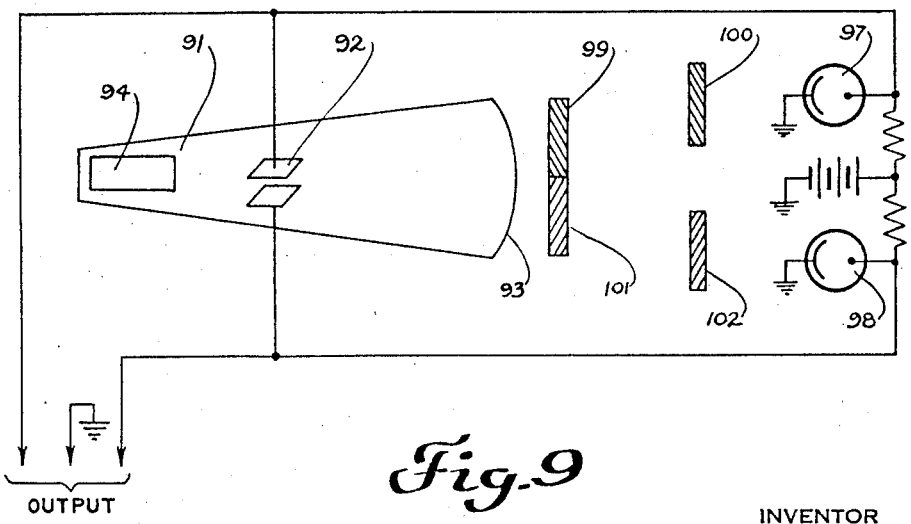
Figure 9 shows a means of using the system in a pushpull arrangement.

The principle of the use of filters for following the motion of a spot as was described in connection with Figure 2 can also be applied in such a way as to obtain a push-pull arrangement of operation. Such a circuit is shown in Figure 9. Here the cathode ray tube 91 has the electron beam formed in electron gun 94. This electron beam is deflected by deflection plates 92, and the spot is formed on the screen 93. In front of this screen, there is a mask composed of two filters 99 and 101.

Two photoelectric cells are employed, 97 and 98. In front of photo cell 97 a filter 100 is placed, and in front of photo cell 98 a filter 102 is placed. Each of these photo cells operates one of the vertical deflection plates of the cathode ray tube, and the output from the circuit is taken from the two deflection plates. This output is of course now a balanced output; i. e., balanced with respect to ground.

Filters 99 and 100 are alike and filters 101 and 102 are alike. The operation of this system is briefly as follows:

When the filter screen composed of 99 and 101 is moved upwards, both photo cells systems are exposed to the spot on the cathode ray tube screen through filter 101. Since filter 100 is opposite in character from that of filter 101, no light reaches photo cell 97, but since filter 102 is the same in character as filter 101, light does reach photo cell 98. This puts an output on the corresponding plate of the cathode ray tube which in turn deflects the spot upward so that the spot on the cathode ray tube comes to rest at the edge of the filter mask as already described. At equilibrium, the spot is substantially equally divided between the two plates if the spot is in the middle. On the other hand, if the spot is nearer the top of the screen than the equilibrium position, less of the spot shows in photo cell 97, and consequently there is a greater voltage on the top deflecting plates than there is on the bottom deflecting plates. The reverse situation is true when the spot is at the bottom end of the screen. Here more of the light enters into photo cell 97 so there is a less positive potential on the lower deflecting plate.

It is also evident that in the diagram which I have shown in Figure 9, it may ordinarily be necessary to incorporate more amplification between the photo cells and the deflecting plates of the cathode ray tube than here shown. This is a matter of well known electronic circuit design.

The embodiments of my invention discussed above have shown methods of utilizing the spot on the screen of a cathode ray tube to follow motions in linear displacement or over a plane, and thus generating voltages proportional to the motion or motions. Sometimes it becomes necessary to effect this same operation when the amplitude of the motion is relatively small.

Figure 3:
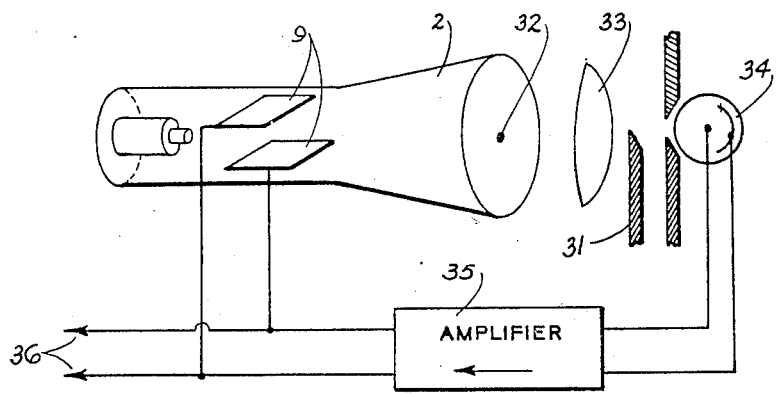
Figure 3 is a diagram of an arrangement for following small motions.

A modification of Figure 1 to accomplish this is shown in Figure 3. Here the device being moved is a mask 31. However, this mask is moved only a very small amount so the image of the spot 32 is focused by lens 33 on the edge of the mask 31. As before, the photo cell 34 picks up the light which comes over the edge of 31, and a corresponding signal output is produced which is applied to the input of amplifier 35. The output voltage of amplifier 35 is used to position the spot 32 by means of the deflecting plates 9 and also constitutes the output signal on conductors 36.

Since lens 33 is so constructed and placed that the image of spot 32 formed at the edge of the mask 31 is very much smaller than the spot 32 itself and since lens 33 has been so arranged that the entire possible excursion of spot 32 is considerably reduced in the image of this moving spot formed near the edge of mask 31, it becomes apparent that a substantial change in the position of spot 32 will correspond to a rather small change in the position of the mask 31. The lens 33, then, has been used to change the scale of the operation so that quite small values of mechanical displacement can be faithfully recorded or reproduced as electrical signals. Such a lens system can also, of course, be used in reverse, in order to accommodate motions which are substantially larger than the motion of the spot on the cathode ray tube screen.

At times it becomes desirable to follow the motion of some object which does not have such a convenient masking action as the mask shown in Figures 1 and 3. That is, it may become desirable to follow the motion of a small wire which does not have a convenient complete masking of all the region below the wire as does the mask 31, for example, in Figure 3.

The system which I have invented will work satisfactorily with such a narrow mask as long as the mask is sufficiently broad so that the spot on the cathode ray tube can come to rest on the upper edge of the mask. However, if for any reason the spot on the cathode ray tube should fall below the mask, then it becomes apparent that the action of the photo cell amplifier combination would be to drive the spot all the way to the bottom of the screen. There it would stay and give an incorrect indication of the position of the mask. Thus, my invention contemplates the addition of a system for returning the spot from the bottom of the screen to the top as soon as the spot should reach the bottom. In this manner it becomes possible to follow a narrow target in front of the screen since it is possible to prevent the spot from staying at the bottom of the screen, thus giving no further indication.

Figure 4:
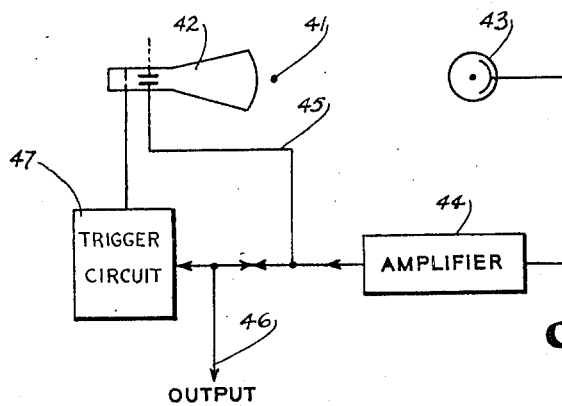
Figure 4 shows a diagram of the system including means for preventing the spot from coming to rest at the wrong place.

A circuit for accomplishing this purpose is shown in Figure 4. In this figure the mask 41 to be followed may be placed directly in front of the cathode ray tube 42. The photoelectric cell 43 again receives light from the spot on the cathode ray tube as cut down by the mask 41, and feeds the response of this light signal into the amplifier 44. The output of the amplifier is, as heretofore described, delivered over conductor 45 to the vertical deflection plates of the cathode ray tube and also over conductor 46 to the output circuit. Here this signal is also fed into a trigger circuit 47, the output of which is fed into the grid of the cathode ray tube.

Under normal operating conditions this trigger circuit receives insufficient input to cause triggering and its output under this condition is made such that a spot of normal brilliance appears on the cathode ray tube.

As the wire 41 moves, the spot follows, and a corresponding voltage output appears on the amplifier 44, all as described hereinabove. If, however, through a fault, the spot should fall away from following the edge of the mask, that is, fall below the mask 41, then the output of the amplifier 44 will drive the spot to the bottom edge of the screen, thereby supplying and maintaining a sufficiently large signal to the trigger 47 to effect its operation. The output of the trigger 47 momentarily blanks the spot of the cathode ray tube, that is, it momentarily turns out the spot on the cathode ray tube, reducing its intensity to practically zero. The resultant loss of light on the photoelectric cell removes the impulse from amplifier 44, thereby permitting the spot of the cathode ray tube to reappear at the top of the screen, since the system was originally set for the spot to rest at the top of the screen when no light was applied to the photoelectric cell.

Once the spot has reached the top of the screen, the blanking signal becomes inoperative and the spot returns to full brilliancy. Normal action sets in at this point and the combination of the photo cell and amplifier and cathode ray tube causes the spot to move downward across the screen until the edge of the mask is reached. Such a method makes it possible to follow targets in the shape of small wires which are subject to heavy vibration without the danger that if the spot should move to the wrong side of the wire, it would go to the bottom of the screen and stay there. The provision for a momentary blanking pulse in the manner described above eliminates this difficulty.

Figure 7:
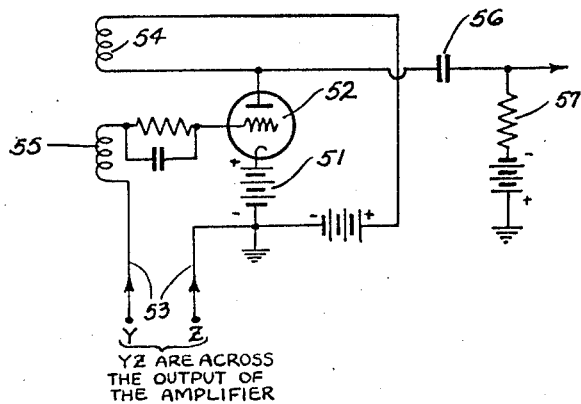
Figure 7 is a schematic diagram of the trigger circuit used in Figure 4.

A specific circuit for accomplishing the triggering action necessary in the circuit of Figure 4 is shown in Figure 7. This circuit is of the blocked oscillator type, the tube 52 being held below cut off by the bias of battery 51 until the signal across the input terminals 53 shall have become sufficiently large so that the plate begins to draw current. When this happens, the current flowing in the inductance 54 induces a voltage in the inductance 55 in such a direction that the grid of the tube 52 rapidly becomes higher in potential; that is, more positive. Consequently, the current in the plate continues to increase. This action is accumulative so that very rapidly the potential of the plate terminal drops from that of the B-battery supply to a value determined by the amount of current flowing in the tube under substantially zero bias conditions. This change in voltage is applied to the grid of the cathode ray tube through capacitor 56 in association with resistor 57 and the normal grid bias on the grid of the cathode ray tube. Thus, this sudden drop in plate potential of tube 52 is applied to the grid of the cathode ray tube as a sudden decrease in grid potential.

A decrease in grid potential causes the beam of the cathode ray tube to become less intense, and consequently if this decrease in voltage is sufficiently great, the spot on the face of the cathode ray tube will diminish in brilliance until it is practically extinguished. This blanking out starts the action of the photo cell amplifier in the proper direction to restore the proper position of the spot to the top of the screen and also terminates the action of the trigger circuit, thus making this system ready for another downward sweep. It will now be obvious that other well known circuits could be applied here for the same purpose as that for which Fig. 7 serves.

Figure 5:
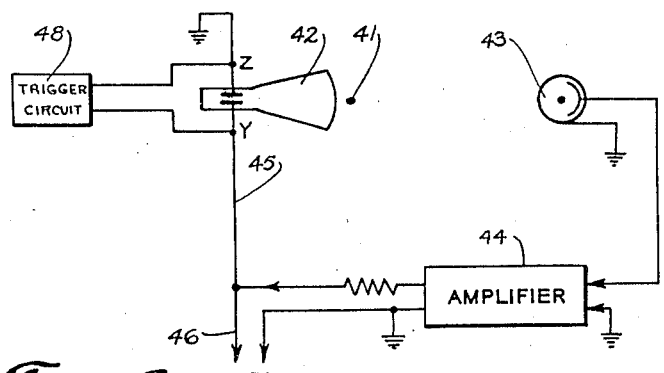
Figures 5 and 6 represent other methods of accomplishing the same thing as was done with the device of Figure 4.

Another circuit for accomplishing the same purpose as Fig. 4 applies the output of the trigger at a different portion of the circuit of Figure 1. Such a circuit arrangement is shown in Figure 5. Here the mask 41, the photo cell 43, the cathode ray tube 42, the amplifier 44, the conductor 45 carrying the signal 46 are the same as in Figure 4.

The trigger 48 is arranged somewhat differently, however. This circuit is arranged so that when the output of the amplifier is such that the spot is at the lowest point of the cathode ray tube surface, the trigger suddenly applies a voltage to the oscilloscope deflecting plates which returns the spot to the top of the oscilloscope screen. When this trigger pulse is removed, the spot will begin its downward travel in accordance with the output of the amplifier 44, and when it reaches the mask 41, the downward travel will stop since the trigger circuit has become inoperative after its momentary shifting of the spot from the bottom of the screen to the top of the screen.

Figure 6:
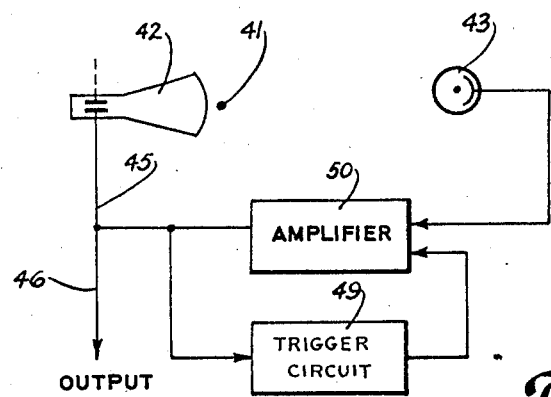

Still another triggering system is shown in Figure 6. Here the trigger circuit 49 takes its input from the output of the amplifier as before, but applies its output to the input of the amplifier 50 in such a manner that when a voltage necessary to drive the spot to the bottom is obtained in the amplifier 50 output, the feed-back through trigger 49 is such as to produce a voltage output in amplifier 50 such as to drive the spot from the bottom of the screen to the top of the screen of the cathode ray tube.

It will be apparent that modifications of the circuit shown in Figure 7 can be used for the triggering circuits required in Figures 5 and 6.

The basic purpose of my invention then is to translate mechanical motion into an electrical signal without requiring any power from the mechanical system. Certain of the embodiments of my invention require the addition of a mask of some sort to the mechanical motion being transcribed; whereas other embodiments of this system notably those involving the translation of only one direction of motion require no such additional mask. Consequently, such systems can faithfully follow mechanical motion without interfering with the performance of the mechanical systems.

The operations herein described are made possible in carrying out my invention by having available a light source, the position or direction of which can be readily moved without substantial inertia by the application of a voltage. Such a device is the cathode ray tube, and consequently the cathode ray tube is a practical element of my invention. It, in combination with the photo cell and the amplifier and the movable object or their equivalents, in the circuit that I have described above, constitutes the main theme of my invention.

Since my invention can be arranged in a great many ways, I prefer to have my invention not bounded by the description given above, but to be described and bounded by the following claims.

I claim:

1. In a system for indicating mechanical movements of an object, a cathode ray tube capable of emitting a cathode ray, deflecting means for deflecting said ray, a luminous screen in said cathode ray tube, a light responsive device exposed to light from said screen, said object being interposed in the path between said screen and light responsive device, means for varying the light impinged on said light responsive device in accordance with a mechanical movement to be indicated, means for controlling the deflecting means of said cathode ray beam in accordance with the variation of light impinged on said light responsive device to restore a state of equilibrium, and means for indicating the electrical conditions necessary to restore the equilibrium.

2. In a system for indicating mechanical movements, a source of light, a light-responsive device exposed to light from said source, means including a cathode ray tube and circuit connections from said light-responsive device for controlling light from said source, a state of equilibrium being normally maintained in which a predetermined amount of light from said source is impinged on said light-responsive device, the light from said source impinged on said light-responsive device being changed in accordance with a mechanical movement being indicated, means responsive to said light-responsive device for varying the light from said source impinged on said light responsive device until a state of equilibrium at a new condition is obtained, and means for indicating electrical conditions in said circuit when said new state of equilibrium is obtained.

3. In a system responsive to mechanical movements, a cathode ray tube capable of emitting a cathode ray beam, means controlled by said cathode ray beam for generating light, means for causing the light generated by said cathode ray beam to follow the mechanical movement of an object in any direction in a plane, the movable object comprising a plurality of sections, each section having individual light characteristics, a light responsive device individual to each section, each of said devices being operated under control of said light, and means for indicating the section through which light passes to said light responsive device.

4. In a system responsive to mechanical movements, a cathode ray tube capable of emitting a cathode ray beam, means controlled by said cathode ray beam for generating light, means for causing the light generated by said cathode ray beam to follow the mechanical movement of an object in any direction in a plane, a pair of light responsive devices, the movable object comprising four quadrant sections, each section having individual light characteristics, and means for indicating the section through which light passes to said light responsive devices.

5. In a system for measuring mechanical movements, a cathode ray tube capable of emitting a cathode ray beam, means controlled by said cathode ray beam for generating light, means for causing the light generated by said cathode ray beam to follow the mechanical movement of an object in any direction in a plane, and a pair of light responsive devices, the movable object comprising four quadrant sections, a first section being transparent, a second section opaque, a third section passing horizontally polarized light, and a fourth passing vertically polarized light polarized perpendicularly to the polarization caused by the third section.

6. In a system responsive to mechanical movements, a cathode ray tube capable of emitting a cathode ray beam, means controlled by said cathode ray beam for generating light, means for causing the light generated by said cathode ray beam to follow the mechanical movement of an object, comprising a light responsive device controlled by light from said cathode ray tube, circuit connections from said light responsive device and said cathode ray tube, the apparatus being so arranged that when the object moves to expose more of the light, the beam is moved to follow the object until the light exposure is again proportional to the position of the object, and if the object is moved to expose less light, the beam is moved to again effect exposure in proportion to the position of the object, and means whereby if the beam passes the object and moves to an end position of its sweep, it is restored to its normal position with respect to the object.

7. In an electrical system, a source of controllable cathode rays, a source of light generated by said cathode rays, a mechanical object, a light-responsive device having an output circuit, light from said source being impinged on said light-responsive device under control of said mechanical object, means including circuit connections from said light-responsive device to said source of cathode rays to move said source of light until the edge of the object prevents some of the light from said source from being impinged on said light-responsive device, the light from said source being thereafter under the control of said object, light-responsive device and said means including circuit connections.

8. In a feed back system, a cathode ray tube capable of emitting a cathode ray beam, deflecting means for deflecting said beam, a luminous screen in said cathode ray tube, a light responsive device exposed to light from said screen, and circuit connections from said light responsive device to said deflecting means for controlling the deflection of the cathode ray in accordance with light impinged on said light responsive device.

DAVID E. SUNSTEIN.

REFERENCES CITED

The following references are of record in the file of this patent:

UNITED STATES PATENTS

| Number | Name | Date |
|---|---|---|
| 1,500,239 | Davis | July 8, 1924 |
| 1,939,443 | Geiselman | Dec. 12, 1933 |
| 1,957,240 | Young | May 1, 1934 |
| 2,027,393 | McCreary | Jan. 14, 1936 |
| 2,110,746 | Tolson | Mar. 8, 1938 |
| 2,206,852 | Ponpitch | July 2, 1940 |
| 2,314,302 | Ziebolz | Mar. 16, 1943 |
| 2,323,724 | Nadal et al. | July 6, 1943 |
| 2,360,751 | Ziebolz | Oct. 17, 1944 |
| 2,361,973 | Smith | Nov. 7, 1944 |
| 2,363,791 | Holden | Nov. 28, 1944 |
| 2,376,459 | Stevens | May 22, 1945 |
| 2,406,982 | Zworykin | Sept. 3, 1946 |

FOREIGN PATENTS

| Number | Country | Date |
|---|---|---|
| 368,775 | Great Britain | Mar. 3, 1932 |
| 378,366 | Germany | Aug. 11, 1932 |
| 672,888 | Germany | Mar. 11, 1939 |